(12) United States Patent
Reddy et al.

(10) Patent No.: US 10,397,271 B2
(45) Date of Patent: Aug. 27, 2019

(54) DISTRIBUTED DENIAL OF SERVICE MITIGATION FOR WEB CONFERENCING

(71) Applicant: Cisco Technology, Inc., San Jose, CA (US)

(72) Inventors: K Tirumaleswar Reddy, Karnataka (IN); Ram Mohan Ravindranath, Karnataka (IN); Prashanth Patil, San Jose, CA (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 66 days.

(21) Appl. No.: 15/646,429

(22) Filed: Jul. 11, 2017

(65) Prior Publication Data

US 2019/0020678 A1 Jan. 17, 2019

(51) Int. Cl.
*H04L 9/32* (2006.01)
*H04L 29/06* (2006.01)

(52) U.S. Cl.
CPC ........ *H04L 63/1458* (2013.01); *H04L 9/3236* (2013.01); *H04L 63/0838* (2013.01);
(Continued)

(58) Field of Classification Search
CPC ............. H04L 63/1458; H04L 63/0838; H04L 63/1425; H04L 9/3236; H04L 65/403
See application file for complete search history.

(56) References Cited

U.S. PATENT DOCUMENTS

| 3,629,512 A | 12/1971 | Yuan |
| 4,769,811 A | 9/1988 | Eckberg, Jr. et al. |

(Continued)

FOREIGN PATENT DOCUMENTS

| CN | 103716123 | 4/2014 |
| CN | 103716137 | 4/2014 |

(Continued)

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.
(Continued)

*Primary Examiner* — Hee K Song
(74) *Attorney, Agent, or Firm* — Polsinelli PC

(57) ABSTRACT

A web conferencing operator can enable participants to share multimedia content in real-time despite one or more of the participants operating from behind a middlebox via network address translation (NAT) traversal protocols and tools, such as STUN, TURN, and/or ICE. In NAT traversal, participants share a transport addresses that the participants can use to establish a joint media session. However, connectivity checks during NAT traversal can expose a media distribution device hosted by the web conferencing operator to various vulnerabilities, such as distributed denial of service (DDoS) attacks. The web conferencing operator can minimize the effects of a DDoS attack during the connectivity checks at scale and without significant performance degradation by configuring the middlebox to validate incoming requests for the connectivity checks without persistent signaling between the web conference operator and the middlebox.

20 Claims, 7 Drawing Sheets

(52) U.S. Cl.
CPC ...... *H04L 63/1425* (2013.01); *H04L 65/1006* (2013.01); *H04L 65/403* (2013.01)

(56) References Cited

U.S. PATENT DOCUMENTS

| | | | |
|---|---|---|---|
| 5,408,231 A | 4/1995 | Bowdon | |
| 5,491,690 A | 2/1996 | Alfonsi et al. | |
| 5,557,609 A | 9/1996 | Shobatake et al. | |
| 5,600,638 A | 2/1997 | Bertin et al. | |
| 5,687,167 A | 11/1997 | Bertin et al. | |
| 6,115,384 A | 9/2000 | Parzych | |
| 6,167,438 A | 12/2000 | Yates et al. | |
| 6,400,681 B1 | 6/2002 | Bertin et al. | |
| 6,661,797 B1 | 12/2003 | Goel et al. | |
| 6,687,229 B1 | 2/2004 | Kataria et al. | |
| 6,799,270 B1 | 9/2004 | Bull et al. | |
| 6,888,828 B1 | 5/2005 | Partanen et al. | |
| 6,993,593 B2 | 1/2006 | Iwata | |
| 7,027,408 B2 | 4/2006 | Nabkel et al. | |
| 7,062,567 B2 | 6/2006 | Benitez et al. | |
| 7,095,715 B2 | 8/2006 | Buckman et al. | |
| 7,096,212 B2 | 8/2006 | Tribble et al. | |
| 7,139,239 B2 | 11/2006 | Mcfarland et al. | |
| 7,165,107 B2 | 1/2007 | Pouyoul et al. | |
| 7,197,008 B1 | 3/2007 | Shabtay et al. | |
| 7,197,660 B1 | 3/2007 | Liu et al. | |
| 7,209,435 B1 | 4/2007 | Kuo et al. | |
| 7,227,872 B1 | 6/2007 | Biswas et al. | |
| 7,231,462 B2 | 6/2007 | Berthaud et al. | |
| 7,333,990 B1 | 2/2008 | Thiagarajan et al. | |
| 7,443,796 B1 | 10/2008 | Albert et al. | |
| 7,458,084 B2 | 11/2008 | Zhang et al. | |
| 7,472,411 B2 | 12/2008 | Wing et al. | |
| 7,486,622 B2 | 2/2009 | Regan et al. | |
| 7,536,396 B2 | 5/2009 | Johnson et al. | |
| 7,552,201 B2 | 6/2009 | Areddu et al. | |
| 7,558,261 B2 | 7/2009 | Arregoces et al. | |
| 7,567,504 B2 | 7/2009 | Darling et al. | |
| 7,571,470 B2 | 8/2009 | Arregoces et al. | |
| 7,573,879 B2 | 8/2009 | Narad et al. | |
| 7,610,375 B2 | 10/2009 | Portolani et al. | |
| 7,643,468 B1 | 1/2010 | Arregoces et al. | |
| 7,644,182 B2 | 1/2010 | Banerjee et al. | |
| 7,647,422 B2 | 1/2010 | Singh et al. | |
| 7,657,898 B2 | 2/2010 | Sadiq | |
| 7,657,940 B2 | 2/2010 | Portolani et al. | |
| 7,668,116 B2 | 2/2010 | Wijnands et al. | |
| 7,684,321 B2 | 3/2010 | Muirhead et al. | |
| 7,738,469 B1 | 6/2010 | Shekokar et al. | |
| 7,751,409 B1 | 7/2010 | Carolan | |
| 7,793,157 B2 | 9/2010 | Bailey et al. | |
| 7,814,284 B1 | 10/2010 | Glass et al. | |
| 7,831,693 B2 | 11/2010 | Lai | |
| 7,852,785 B2 | 12/2010 | Lund et al. | |
| 7,860,095 B2 | 12/2010 | Forissier et al. | |
| 7,860,100 B2 | 12/2010 | Khalid et al. | |
| 7,895,425 B2 | 2/2011 | Khalid et al. | |
| 7,899,012 B2 | 3/2011 | Ho et al. | |
| 7,899,861 B2 | 3/2011 | Feblowitz et al. | |
| 7,907,595 B2 | 3/2011 | Khanna et al. | |
| 7,908,480 B2 | 3/2011 | Firestone et al. | |
| 7,983,174 B1 | 7/2011 | Monaghan et al. | |
| 7,990,847 B1 | 8/2011 | Leroy et al. | |
| 8,000,329 B2 | 8/2011 | Fendick et al. | |
| 8,018,938 B1 | 9/2011 | Fromm et al. | |
| 8,094,575 B1 | 1/2012 | Vadlakonda et al. | |
| 8,095,683 B2 | 1/2012 | Balasubramanian Chandra | |
| 8,116,307 B1 | 2/2012 | Thesayi et al. | |
| 8,166,465 B2 | 4/2012 | Feblowitz et al. | |
| 8,180,909 B2 | 5/2012 | Hartman et al. | |
| 8,191,119 B2 | 5/2012 | Wing et al. | |
| 8,195,774 B2 | 6/2012 | Lambeth et al. | |
| 8,280,354 B2 | 10/2012 | Smith et al. | |
| 8,281,302 B2 | 10/2012 | Durazzo et al. | |
| 8,291,108 B2 | 10/2012 | Raja et al. | |
| 8,305,900 B2 | 11/2012 | Bianconi | |
| 8,311,045 B2 | 11/2012 | Quinn et al. | |
| 8,316,457 B1 | 11/2012 | Paczkowski et al. | |
| 8,355,332 B2 | 1/2013 | Beaudette et al. | |
| 8,442,043 B2 | 5/2013 | Sharma et al. | |
| 8,451,817 B2 | 5/2013 | Cheriton | |
| 8,464,336 B2 | 6/2013 | Wei et al. | |
| 8,473,981 B1 | 6/2013 | Gargi | |
| 8,479,298 B2 | 7/2013 | Keith et al. | |
| 8,498,414 B2 | 7/2013 | Rossi | |
| 8,520,672 B2 | 8/2013 | Guichard et al. | |
| 8,601,152 B1 | 12/2013 | Chou | |
| 8,605,588 B2 | 12/2013 | Sankaran et al. | |
| 8,612,612 B1 | 12/2013 | Dukes et al. | |
| 8,627,328 B2 | 1/2014 | Mousseau et al. | |
| 8,645,952 B2 | 2/2014 | Biswas et al. | |
| 8,676,965 B2 | 3/2014 | Gueta | |
| 8,676,980 B2 | 3/2014 | Kreeger et al. | |
| 8,700,892 B2 | 4/2014 | Bollay et al. | |
| 8,724,466 B2 | 5/2014 | Kenigsberg et al. | |
| 8,730,980 B2 | 5/2014 | Bagepalli et al. | |
| 8,743,885 B2 | 6/2014 | Khan et al. | |
| 8,751,420 B2 | 6/2014 | Hjelm et al. | |
| 8,762,534 B1 | 6/2014 | Hong et al. | |
| 8,762,707 B2 | 6/2014 | Killian et al. | |
| 8,792,490 B2 | 7/2014 | Jabr et al. | |
| 8,793,400 B2 | 7/2014 | Mcdysan et al. | |
| 8,812,730 B2 | 8/2014 | Vos et al. | |
| 8,819,419 B2 | 8/2014 | Carlson et al. | |
| 8,825,070 B2 | 9/2014 | Akhtar et al. | |
| 8,830,834 B2 | 9/2014 | Sharma et al. | |
| 8,904,037 B2 | 12/2014 | Haggar et al. | |
| 8,984,284 B2 | 3/2015 | Purdy, Sr. et al. | |
| 9,001,827 B2 | 4/2015 | Appenzeller | |
| 9,071,533 B2 | 6/2015 | Hui et al. | |
| 9,077,661 B2 | 7/2015 | Andreasen et al. | |
| 9,088,584 B2 | 7/2015 | Feng et al. | |
| 9,130,872 B2 | 9/2015 | Kumar et al. | |
| 9,143,438 B2 | 9/2015 | Khan et al. | |
| 9,160,797 B2 | 10/2015 | Mcdysan | |
| 9,178,812 B2 | 11/2015 | Guichard et al. | |
| 9,189,285 B2 | 11/2015 | Ng et al. | |
| 9,203,711 B2 | 12/2015 | Agarwal et al. | |
| 9,253,274 B2 | 2/2016 | Quinn et al. | |
| 9,300,579 B2 | 3/2016 | Frost et al. | |
| 9,300,585 B2 | 3/2016 | Kumar et al. | |
| 9,311,130 B2 | 4/2016 | Christenson et al. | |
| 9,319,324 B2 | 4/2016 | Beheshti-Zavareh et al. | |
| 9,325,565 B2 | 4/2016 | Yao et al. | |
| 9,338,097 B2 | 5/2016 | Anand et al. | |
| 9,344,337 B2 | 5/2016 | Kumar et al. | |
| 9,374,297 B2 | 6/2016 | Bosch et al. | |
| 9,379,931 B2 | 6/2016 | Bosch et al. | |
| 9,385,950 B2 | 7/2016 | Quinn et al. | |
| 9,398,486 B2 | 7/2016 | La Roche, Jr. et al. | |
| 9,407,540 B2 | 8/2016 | Kumar et al. | |
| 9,413,655 B2 | 8/2016 | Shatzkamer et al. | |
| 9,424,065 B2 | 8/2016 | Singh et al. | |
| 9,436,443 B2 | 9/2016 | Chiosi et al. | |
| 9,444,675 B2 | 9/2016 | Guichard et al. | |
| 9,473,570 B2 | 10/2016 | Bhanujan et al. | |
| 9,479,443 B2 | 10/2016 | Bosch et al. | |
| 9,491,094 B2 | 11/2016 | Patwardhan et al. | |
| 9,537,836 B2 | 1/2017 | Maller et al. | |
| 9,558,029 B2 | 1/2017 | Behera et al. | |
| 9,559,970 B2 | 1/2017 | Kumar et al. | |
| 9,571,405 B2 | 2/2017 | Pignataro et al. | |
| 9,608,896 B2 | 3/2017 | Kumar et al. | |
| 9,614,739 B2 | 4/2017 | Kumar et al. | |
| 9,660,909 B2 | 5/2017 | Guichard et al. | |
| 9,723,106 B2 | 8/2017 | Shen et al. | |
| 9,774,533 B2 | 9/2017 | Zhang et al. | |
| 9,794,379 B2 | 10/2017 | Kumar et al. | |
| 9,882,776 B2 | 1/2018 | Aybay et al. | |
| 9,929,945 B2 | 3/2018 | Schultz et al. | |
| 10,003,530 B2 | 6/2018 | Zhang et al. | |
| 2001/0023442 A1 | 9/2001 | Masters | |
| 2002/0085562 A1 | 7/2002 | Hufferd et al. | |
| 2002/0131362 A1 | 9/2002 | Callon | |

(56) References Cited

U.S. PATENT DOCUMENTS

| | | |
|---|---|---|
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kowali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |

(56) References Cited

U.S. PATENT DOCUMENTS

| | | |
|---|---|---|
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0119159 A1 | 4/2016 | Zhao et al. |
| 2016/0119253 A1* | 4/2016 | Kang .............. H04L 67/2814 370/228 |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2016/0380967 A1* | 12/2016 | Moore .............. H04L 65/1069 709/217 |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0142165 A1* | 5/2017 | Moore .............. H04L 43/0811 |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |
| 2018/0124123 A1* | 5/2018 | Moore .............. H04L 65/1069 |

FOREIGN PATENT DOCUMENTS

| | | |
|---|---|---|
| EP | 3160073 A1 | 4/2017 |
| JP | 2016149686 | 8/2016 |
| WO | WO-2011029321 A1 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO-2016004556 A1 | 1/2016 |
| WO | WO 2016/058245 | 4/2016 |
| WO | WO 2017/011607 | 1/2017 |

OTHER PUBLICATIONS

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "OpenNebula 4.6 User Guide," Jun. 12, 2014, opennebula.org, 87 pages.

Author Unknown, "Service-Aware Network Architecture Based on SDN, NFV, and Network Intelligence," 2014, 8 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Bremler-Barr, Anat, et al., "Deep Packet Inspection as a Service," CoNEXT '14, Dec. 2-5, 2014, pp. 271-282.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Farrel, A., et al., "A Path Computation Element (PCE)—Based Architecture," RFC 4655, Network Working Group, Aug. 2006, 40 pages.

Jiang, Y., et al., "An Architecture of Service Function Chaining," IETF Network Working Group Internet Draft, draft-jiang-sfc-arch-01.txt, Feb. 14, 2014; 12 pages.

Katsikas, Goergios P., et al., "Profiling and accelerating commodity NFV service chains with SCC," The Journal of Systems and Software, vol. 127, Jan. 2017, pp. 12-27.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

Newman, David, "Review: FireEye fights off multi-stage malware," Network World, May 5, 2014, 7 pages.

Nguyen, Kim-Khoa, et al. "Distributed Control Plane Architecture of Next Generation IP Routers," IEEE, 2009, 8 pages.

Quinn, P., et al., "Network Service Header," Network Working Group, Mar. 24, 2015, 42 pages; https://tools.ietf.org/pdf/draft-ietf-sfc-nsh-00.pdf.

Quinn, P., et al., "Network Service Chaining Problem Statement," draft-quinn-nsc-problem-statement-03.txt, Aug. 26, 2013, 18 pages.

Quinn, Paul, et al., "Service Function Chaining: Creating a Service Plane via Network Service Headers," IEEE Computer Society, 2014, pp. 38-44.

Zhang, Ying, et al. "StEERING: A Software-Defined Networking for Inline Service Chaining," IEEE, 2013, IEEE, p. 10 pages.

Aldrin, S., et al. "Service Function Chaining Operation, Administration and Maintenance Framework," Internet Engineering Task Force, Oct. 26, 2014, 13 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWA Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages,

(56) References Cited

OTHER PUBLICATIONS http://en.wikipedia.org/w/index.php?title=Dynamic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.ul/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "Understanding Azure, A Guide for Developers," Microsoft Corporation, Copyright © 2016 Microsoft Corporation, 39 pages.

Baird, Andrew, et al. "AWS Serverless Multi-Tier Architectures; Using Amazon API Gateway and AWS Lambda," Amazon Web Services Inc., Nov. 2015, 20 pages.

Boucadair, Mohamed, et al., "Differentiated Service Function Chaining Framework," Network Working Group Internet Draft draft-boucadair-network-function-chaining-03, Aug. 21, 2013, 21 pages.

Cisco Systems, Inc. "Cisco NSH Service Chaining Configuration Guide," Jul. 28, 2017, 11 pages.

Ersue, Mehmet, "ETSI NFV Management and Orchestration—An Overview," Presentation at the IETF#88 Meeting, Nov. 3, 2013, 14 pages.

Fayaz, Seyed K., et al., "Efficient Network Reachability Analysis using a Succinct Control Plane Representation," 2016, ratul.org, pp. 1-16.

Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconsin, Madison, Jun. 20, 2016, 7 pages, https://www.usenix.org/system/files/conference/hotcloud16/hotcloud16_hendrickson.pdf.

Jiang, Yuanlong, et al., "Fault Management in Service Function Chaining," Network Working Group, China Telecom, Oct. 16, 2015, 13 pages.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Wong, Fei, et al., "SMPTE-TT Embedded in ID3 for HTTP Live Streaming, draft-smpte-id3-http-live-streaming-00," Information Internet Draft, Jun. 2012, 7 pages http://tools.ietf.org/htnnl/draft-snnpte-id3-http-live-streaming-00.

Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

3GPP TR 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9), 3rd Generation Partnership Project (3GPP), 650 Route des Lucioles—Sophia Antipolis Valbonne—France, Jun. 2010; 259 pages.

3GPP TR 23.803 V7.0.0 (Sep. 2005) Technical Specification: Group Services and System Aspects; Evolution of Policy Control and Charging (Release 7), 3rd Generation Partnership Project (3GPP), 650 Route des Lucioles—Sophia Antipolis Val bonne—France, Sep. 2005; 30 pages.

3GPP TS 23.203 V8.9.0 (Mar. 2010) Technical Specification: Group Services and System Aspects; Policy and Charging Control Architecture (Release 8), 3rd Generation Partnership Project (3GPP), 650 Route des Lucioles—Sophia Antipolis Val bonne—France, Mar. 2010; 116 pages.

3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP, 650 Route des Lucioles—Sophia Antipolis Valbonne—France, Dec. 2015.

3GPP TS 29.212 V13.1.0 (Mar. 2015) Technical Specification: 3rd Generation Partnership Project; Technical Specification Group Core Network and Terminals; Policy and Chargig Control (PCC); Reference points (Release 13), 3rd Generation Partnership Project (3GPP), 650 Route des Lucioles—Sophia Antipolis Valbonne—France, Mar. 2015; 230 pages.

U.S. Appl. No. 15/252,028, filed Aug. 30, 2016, entitled "System and Method for Managing Chained Services in a Network Environment," Inventor(s): Hendrikus G.P. Bosch, et al.

P. Quinn, et al., "Network Service Header," Network Working Group, Feb. 14, 2014, 21 pages; https://svn.tools.ietf.org/html/draft-quinn-sfc-nsh-02.

P. Quinn, et al., "Service Function Chaining (SFC) Architecture," Network Working Group, May 5, 2014, 31 pages; https://svn.tools.ietf.org/html/draft-quinn-sfc-arch-05.

International Search Report and Written Opinion from the International Searching Authority, dated Aug. 30, 2017, for the corresponding International Application No. PCT/US2017/040575, 13 pages.

\* cited by examiner

DISTRIBUTED DENIAL OF SERVICE MITIGATION FOR WEB CONFERENCING

TECHNICAL FIELD

The subject matter of this disclosure relates in general to the field of web conferencing, and more specifically to techniques for a web conferencing operator to mitigate distributed denial of service (DDOS) attacks.

BACKGROUND

Web conferencing is a technology that facilitates the distribution of real-time multimedia flows between electronic devices over the Internet or other wide-area network (WAN). The distributed multimedia may include audio, video, Short Message Service (SMS) or instant messenger text, and other digital content (e.g., word processing documents, spreadsheets, powerpoints, web browser content, whiteboard content, polls, surveys, etc.). Users may access a web conferencing platform offered by a software-as-a-service (SaaS) provider off-premises and/or supported by an enterprise data center operating the platform on-premises. Web conferencing can allow users from almost anywhere in the world to collaborate with one another in various ways, such as to conduct business meetings and seminars, lead presentations, provide online education, and offer direct customer support, among other possibilities. While expanding the ways that users can collaborate with one another offers obvious benefits, providing greater accessibility can also render a web conferencing operator's network more susceptible to certain vulnerabilities.

DESCRIPTION OF EXAMPLE EMBODIMENTS

Overview

Figure 1:
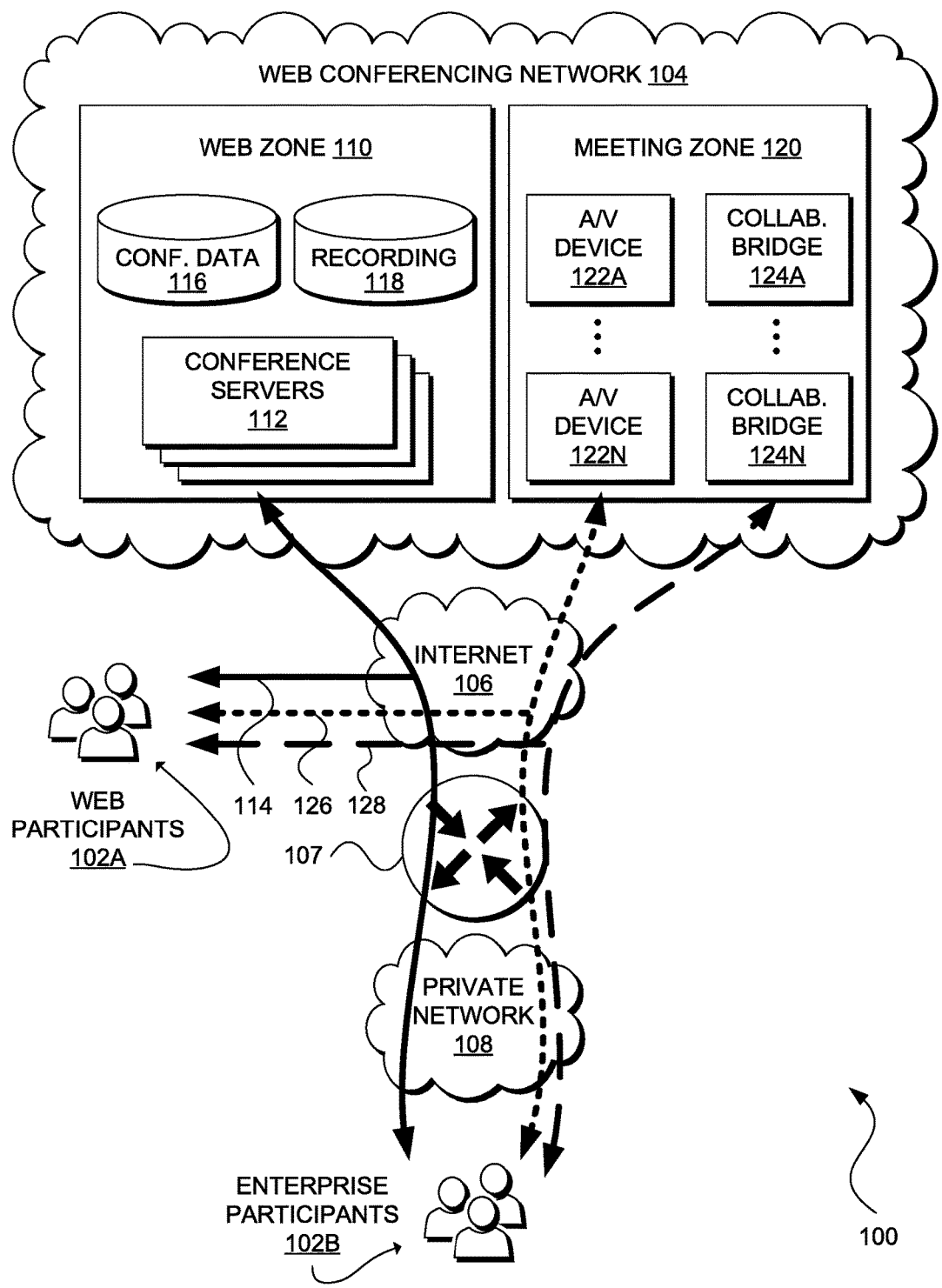
FIG. 1 illustrates an example of a network configuration including a web conference platform in accordance with an embodiment.

Various aspects of the subject technology relate to minimize the effects of DDoS attacks. A system may be configured to acquire one-time password (OTP) data for validating one or more connectivity checks for establishing a media session with a media distribution device (MDD). The OTP data may include a sequencing function. A set of passkeys may be determined by applying the sequencing function to a seed value to acquire a first passkey and successively applying the sequencing function to a latest passkey to acquire one or more additional passkeys. The system may receive a request that includes a sequence value and a passkey. The request is for a connectivity check from an endpoint external to the web conferencing network for establishing the media session with the MDD. The system may validate the username based at least in part by applying the sequencing function to the sequence value to acquire a computed value and comparing the computed value to the passkey.

Example Embodiments

A web conferencing operator allows participants to share multimedia content in real-time despite one or more participants operating from behind a middlebox (e.g., a network address translator (NAT), a firewall, and/or other middlebox(es) that may block traffic) via NAT traversal protocols and tools (e.g., Session Traversal Utilities for NAT (STUN), Traversal Using Relays around NAT (TURN), Interactive Connectivity Establishment (ICE)). In NAT traversal, participants can share a set of transport addresses that the participants may use to establish a joint media session. However, connectivity checks performed during NAT traversal can expose a device for the media session hosted by the web conferencing operator (referred to as a media distribution device (MDD)) to various vulnerabilities, such as distributed denial of service (DDoS) attacks.

A web conferencing operator can minimize the effects of DDoS attacks during connectivity checks at scale and without significant performance degradation by configuring a middlebox to validate the connectivity checks without persistent signaling between the web conferencing operator and the middlebox. In some embodiments, the middlebox can validate an incoming request for a connectivity check on the basis of the username in the request (e.g., a STUN request) based on a one-time password (OTP) scheme, such as the Lamport OTP algorithm. The web conferencing operator can generate a sequencing algorithm F and initial seed value $S_0$ to share with the middlebox for authenticating connectivity checks for a specified number of requests n (or a specified period of time t based on a function T of the average number of requests received per unit of time u). The middlebox can generate a set of passkeys or passkey "cache" $\mathbb{S}$ for the specified sequence length $\bar{n}$ (or the specified time period $T(\bar{n}, t)$) by first applying the sequencing algorithm F to the seed value $S_0$ to acquire the first passkey $S_1$, and then successively applying the sequencing algorithm F to the resulting passkey to acquire one or more additional passkeys $S_{2\ldots n-1}$. The web conferencing operator can integrate the OTP scheme with the conventional authentication scheme for a connectivity check by including a sequence value $S_m$ and its corresponding passkey $S_{m+1}$ in the username. The middlebox can inspect each incoming request for a connectivity check to extract the sequence number $S_m$ and passkey $S_{m+1}$ from the username. The middlebox can forward the request to the MDD if the value obtained by applying the sequencing algorithm F to the sequence number $S_m$ matches the passkey $S_{m+1}$, or drop the request if there is no match.

In some embodiments, the middlebox can validate an incoming request for a connectivity check on the basis of the message integrity of the request. For example, the web conference operator and the middlebox can negotiate between themselves a secret key, key identifier, counter, and cryptographic hash function (e.g., keyed-hash message authentication code (HMAC)-MD5, HMAC-SHA-1, HMAC-SHA-2, or other suitable HMAC algorithm). The web conference operator can use the key identifier for key management. The web conference operator can create a short-term credential (i.e., username and password) for each participant. The web conference operator can compute the password by applying the secret key, key identifier, counter, and other data to the cryptographic hash function.

The web conference operator can derive the first portion of the username as discussed above, and concatenate the key identifier, counter, and a current timestamp to the first portion of the username. The middlebox can inspect each incoming request for a connectivity check, and use the counter and current timestamp in the username to calculate the password and validate the message integrity of the request. This can also help the middlebox to detect and block replay attacks.

In some embodiments, if a DDoS attack comprising invalid requests for connectivity checks grows beyond the capacity of the middlebox, then the middlebox can operate as a DDoS Open Threat Signaling (DOTS) client and signal a DOTS server (e.g., a third party provider of DDoS mitigation as a service) to take over DDoS mitigation. The middlebox can pass the values and algorithms negotiated with the web conference operator discussed above to the DOTS server, and the DOTS server can handle DDoS mitigation until the number of incoming requests for connectivity checks returns to a volume manageable by the middlebox (or a specified time thereafter to account for secondary DDoS attacks).

FIG. 1 illustrates an example of a network configuration 100 including web participants 102A and enterprise participants 102B (collectively, "participants 102") interacting with one another via web conferencing network 104. One of ordinary skill in the art will understand that, for network configuration 100 and any system discussed in the present disclosure, there can be additional or fewer nodes, devices, links, networks, or components in similar or alternative configurations. Various embodiments may include different numbers and/or types of clients, networks, nodes, cloud components, servers, software components, devices, virtual or physical resources, configurations, topologies, services, appliances, deployments, network devices, etc. The illustrations and examples provided in the present disclosure are for conciseness and clarity.

Participants 102 can use various types of electronic devices or endpoints to interact with web conferencing network 104, including analog endpoints (e.g., fax machines, modems, telecommunication devices for the deaf (TDDs), teletypewriters (TTYs), analog phones, etc.); enterprise desk phones; video endpoints (e.g., instant messaging clients like Cisco Jabber® provided by Cisco Systems®, Inc. of San Jose, Calif., IP phones with built-in video cameras, telepresence systems, etc.); software-based endpoints or software applications that provide voice and video services (e.g., Cisco® IP Communicator, Cisco Jabber® desktop clients, Cisco Spark™ desktop clients, Cisco UC Integration™, etc.) for personal computing devices (e.g., workstations, desktops, laptops, etc.); and mobile endpoints (e.g., Cisco Jabber® mobile clients, Cisco Spark™ mobile clients (e.g., smartphones, tablets, wearable devices, etc.), Cisco WebEx® Meetings, AnyConnect® Secure mobile clients from Cisco®, etc.). In this example, web participants 102A connect to web conferencing network 104 over a public wide-area network (WAN) (e.g., Internet 106), and enterprise participants 102B connect to web conferencing network 104 from an enterprise network (e.g., private network 108) through network infrastructure 107 and Internet 106. Web conferencing network 104 can also be a participant as it can effectively operate as a hub for conferences.

Web conferencing network 104 is generally a system that enables users (i.e., enterprises or other organizations, individual persons, etc.) in different physical locations to share digital content in real-time (i.e., in a manner with imperceptible delay or a negligible amount of delay with respect to an average person). Web conferencing network 104 can be part of the computing infrastructure of a service provider that offers web conferencing software as a service (SaaS) or part of an enterprise data center that supports web conferencing on-premises. Web conferencing network 104 can support at least voice and video conferencing. In some embodiments, web conferencing network 104 may also support multimedia sharing; analog or digital audio and voice over IP (VoIP) integration; conference recording, editing, and playback; polls and surveys; annotation; virtual whiteboards; and other collaboration functionality. Examples of web conferencing platforms include Cisco WebEx® and Cisco Spark™.

In this example, web conferencing network 104 includes web zone 110 and meeting zone 120. Web zone 110 can generally be responsible for tasks that happen before and after a web conference, such as scheduling, user management, billing, reporting, and streaming recordings, etc. Web zone 110 can include one or more conference servers 112 for coordinating these various pre-conference and post-conference operations. Conference servers 112 can also handle signaling over communication channel 114 (i.e., signaling channel 114) using signaling protocols/mechanisms such as Session Initiation Protocol (SIP), H.323, Skinny Call Control Protocol (SCCP), Extensible Messaging and Presence Protocol (XMPP), Representational State Transfer (REST), and/or other suitable signaling techniques. Participants 102 can join web conferences by first connecting to conference servers 112. Conference servers 112 ensure that participants can establish connectivity and participate in a conference. To maintain the data to perform these various functions, web zone 110 can include conference data storage 116 for storing scheduling, user, billing, reporting, and other data and recording storage 118 for storing web conference recordings (i.e., audio, video, and other digital content shared during a conference).

Meeting zone 120 can generally be responsible for web conference switching once a web conference is in progress. Meeting zone 120 can include one or more audio/video (A/V) devices 122A . . . 122N (collectively, "122") and one or more collaboration bridges 124A . . . 124N (collectively, "124"). A/V devices 122 can perform audio and video packet processing operations such as A/V packet mixing, switching, encoding, decoding, and transcoding. A/V devices 122 can exchange A/V content with participants 102 over communication channel 126 (i.e., A/V channel 126). Collaboration bridges 124 can switch other content shared during a conference (i.e., content other than A/V content of a web conference), such as data sent as part of a file sharing operation (including music, movies, animations, etc.), a chat operation, a virtual white board application, and other digital content. Collaboration bridges 124 can exchange this type of conference traffic over communication channel 128 (i.e., conference traffic channel 128).

Figure 2:
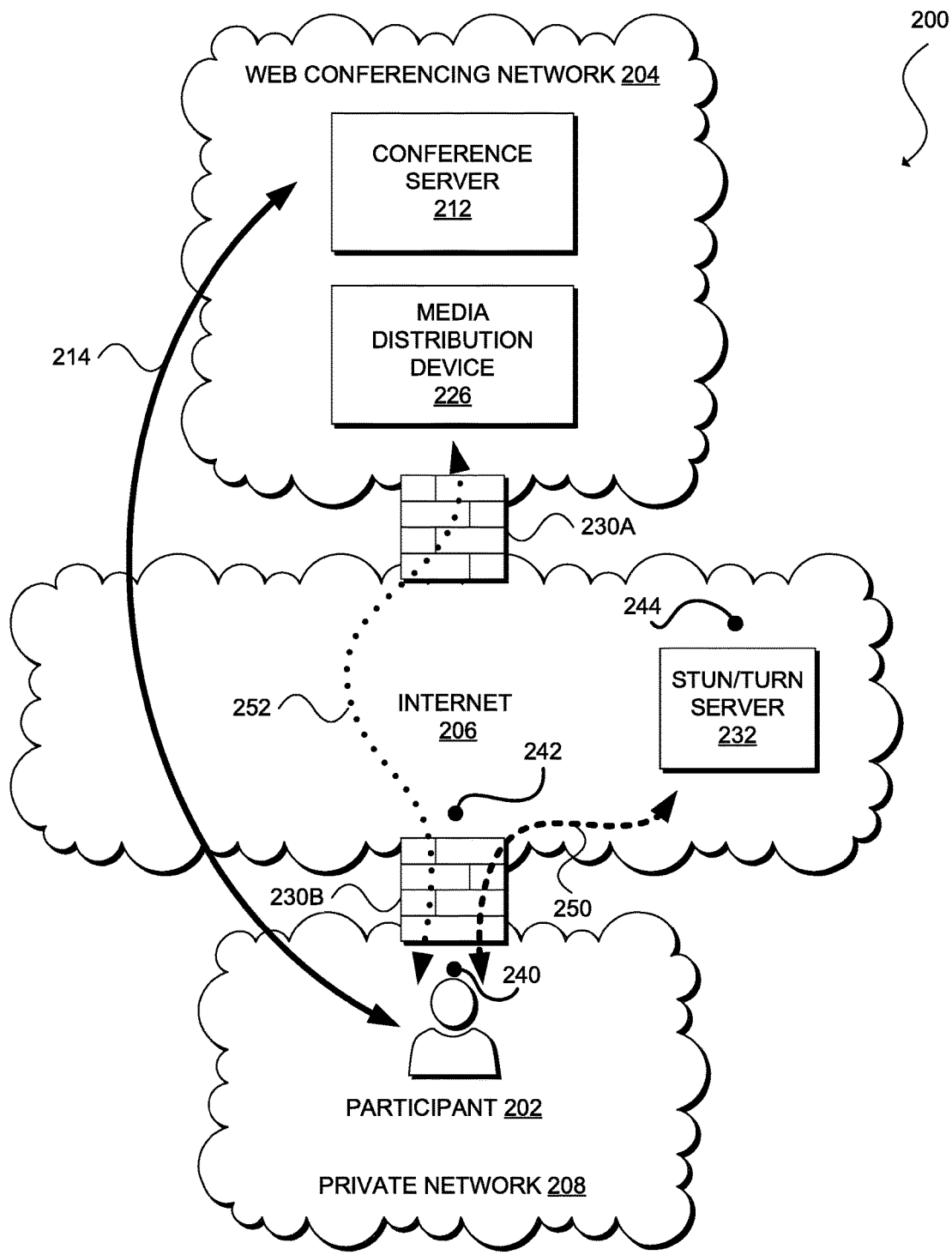
FIG. 2 illustrates an example of a network configuration including middleboxes and a web conference platform in accordance with an embodiment.

FIG. 2 illustrates an example of a network configuration 200 including participant 202 operating from private network 208 to interact with web conferencing network 204. Private network 208 connects to web conferencing network 204 over a WAN (e.g., Internet 206). Web conferencing network 204 can include functionality similar to web conferencing network 104 of FIG. 1. For instance, web conferencing network 204 includes conference server 212 for controlling signaling between web conferencing network 204 and private network 208 via communication channel 214 (i.e., signaling channel 214) in a manner similar to conference servers 112 controlling signaling between web conferencing network 104 and private network 108 via signaling channel 114. Web conferencing network 204 may include fewer elements than web conferencing network 104 for simplicity and conciseness. For instance, web conferencing network 204 includes media distribution device (MDD) 226, which can consolidate the functionality provided by A/V devices 122 and collaboration bridges 124. Web conferencing network 204 can include additional elements not explicitly shown in web conferencing network 104 for purposes of demonstrating particular aspects of the present technology. For instance, web conferencing network 204 and private network 208 respectively include middleboxes 230A and 230B (collectively, "230") for providing private network address spaces, network security, and other functionality.

Middleboxes 230 are physical or virtual network appliances that transform, inspect, filter, or otherwise manipulate traffic for purposes other than packet forwarding, and can include network address translators (NATs), firewalls, DDoS mitigators, load balancers, intrusion prevent systems (IPSs), intrusion detection systems (IDSs), WAN optimizers, etc. A middlebox can be a physical network device that performs one or more networking functions. A middlebox can also be a virtual device (e.g., virtual machine (VM), container, or other virtual partition) that performs one or more network services in a service chain.

In this example, participant 202 is behind middlebox 230B, which can operate as a NAT, firewall, or other network device that blocks incoming traffic to participant 202. This type of deployment may prevent web conferencing network 204 from reaching participant 202 if web conferencing network 204 only knew the local interface address of participant 202. Indeed, offer/answer protocols such as SIP can be difficult to operate through NATs, firewalls, and the like. A purpose of such protocols is to establish a flow of media packets, and offer/answer protocols often specify that the network addresses and ports of media sources and destinations reside within their messages. As known to one of ordinary skill, it is generally bad practice to modify the payload of packets, and thus administrators disfavor approaches for enabling communication between endpoints separated by NAT/firewall by altering network addresses and ports contained within the data portion of messages. Offer/answer protocols may also seek to create a direct media flow between participants such that there is no application layer intermediary between them. The intent of such design is to reduce media latency, decrease packet loss, and reduce the operational costs of deploying the application. However, as a skilled artisan knows, this can be difficult to accomplish through NATs/firewalls. An approach for establishing media sessions between endpoints when one or more the endpoints operate from behind NATs/firewalls is to implement a NAT traversal protocol such as Interactive Connectivity Establishment (ICE), as defined in Request for Comments (RFC) 5245 by the Internet Engineering Task Force (IETF).

In ICE, each participant can potentially have a variety of candidate transport addresses (i.e., a combination of network address (e.g., Internet Protocol (IP) address, uniform resource locator (URL), or other identifier) and port for a particular transport protocol (e.g., User Datagram Protocol (UDP), Transmission Control Protocol (TCP), etc.)) for establishing a media session. The candidate transport addresses can include transport addresses on directly attached network interfaces of the endpoints (e.g., candidate 240), translated transport addresses on the public side of a NAT (referred to as a server reflexive addresses) (e.g., candidate 242), and transport addresses allocated from a server supporting the Traversal Using Relay NAT (TURN) protocol (referred to as a relayed address) (e.g., candidate 244). Potentially any of the candidate transport addresses of participant 202 may connect with the candidate transport addresses of web conferencing network 204. In practice, however, many combinations will not work. For example, as participant 202 is behind NAT/firewall 230B, its directly attached interface address(es) is/are unlikely to be able to communicate directly with web conferencing network 204. ICE can discover which pairs of addresses may work for sharing media by systematically trying all possible pairs in a sorted order until one or more pairs work.

ICE can include multiple phases, including a candidates gathering phase, an exchange of candidates phase, a connectivity checks phase, and a final exchange phase. In the candidates gathering phase, each participant can determine its candidate transport addresses. In some embodiments, participants can gather candidates even before initiating a media session. In this example, participant 202 can acquire its server reflexive and relayed candidate transport addresses by sending Session Traversal Utilities for NAT (STUN) (defined in RFC 5389) and/or TURN (defined in RFC 5766) requests to STUN/TURN server 232 and receiving STUN/TURN responses from STUN/TURN server 232 over communication channel 250. Although FIG. 2 shows STUN/TURN server 232 being located in Internet 206, STUN/TURN server 232 can also reside in a demilitarized zone (DMZ) of private network 208. In some embodiments, participants can acquire both server reflexive and relayed transport addresses by communicating with only a TURN server if the query to the TURN server passes through a NAT and the NAT creates bindings for the request.

In the exchange of candidates phase, each participant can order its candidates from highest to lowest priority. For example, participant 202 (i.e., the caller) can initiate a media session by sending an offer), such as a Session Description Protocol (SDP) offer in an SIP INVITE, to conference server 212 (i.e., the callee) over signaling channel 214. The offer can include information for each candidate transport address (e.g., network address and port, component identifier, foundation, transport protocol, priority, type, related address, etc.), a username fragment, and password. Conference server 212 can send an SDP answer including similar information as the offer (but specific to web conferencing network 204). In this example, conference server 212 may send an SDP answer including transport address information for MDD 226.

In the connectivity checks phase, each participant pairs up its candidates (referred to as local candidates) with the other participants' candidates (referred to as remote candidates) to form candidate pairs. Each participant can send a connectivity check in pair priority order (i.e., a binding request from the local candidate to the remote candidate). Each participant can send a response to a request for a connectivity check that includes a mapped address indicating the source network address and port seen in the request to signal that connectivity has succeeded.

In some embodiments, participants can authenticate and protect the integrity of the connectivity checks based on the usernames and passwords exchanged during the SDP offer and answer. Each participant can construct the username by combining username fragments exchanged in the offer and answer (separated by a colon), and exchanging the passwords from the offer and answer. For example, if participant 202 sends an SDP offer with username fragment "UF_A" and password "PASS_A" and web conferencing network 204 sends the SDP answer with username fragment "UF_B" and password "PASS_B," then participant 202 must send a request for a connectivity check that includes username "UF_B:UF_A" and password "PASS_B" and web conferencing network 204 must send a request for a connectivity check that includes username "UF_A:UF_B" and password "PASS_A."

In the final exchange phase, one participant operates as the controlling agent (typically the offeror) and the other participant operates as the controlled agent. The controlling agent is responsible for deciding when connectivity checks should finish and deciding which pairs to use for the session thereafter, such as by sending a request for a connectivity check that includes a flag indicating an end to the connectivity checks and for participants to use the candidate pair generated by the connectivity check that included the flag. Media can flow in each direction once the controlling agent has selected the candidate pairs for each component. In this example, participant 202 and MDD 226 successfully complete connectivity checks and establish a media session over communication channel 252.

ICE also supports a mode referred to as ICE Lite for endpoints that always have public IP addresses (e.g., public switched telephone network (PSTN) gateways, media servers, conference servers, etc.). A participant signals that it is "Lite" in an offer or an answer and has a single candidate transport address (i.e., its host IP address), and such a participant may only need to receive a request for a connectivity check and send a response, process offers and answers, and use the candidate pair based on a flagged connectivity check.

As discussed, the connectivity checks phase can open MDD 226 up to various attacks, including distributed denial of service (DDOS) attacks. Conventional security middleboxes such as DDoS mitigators, intrusion detection systems (IDSs), intrusion prevention systems (IPSs), and similar network appliances may struggle to protect against DDoS attacks at the connectivity checks phase because the middleboxes cannot determine the legitimacy of connectivity check messages. For example, there is no way for middlebox 230A to verify the integrity of connectivity check requests from participant 202 because middlebox 230A was not involved in initiation of the media session when participant 202 and conference server 212 exchanged credentials. It may also be impractical for middlebox 230A to request credentials from conference server 212 for each request for a connectivity check and/or for conference server 212 to continuously push the credentials because of the additional processing, bandwidth, and other computing resources expended to implement such a strategy. In addition, there may be difficulties in associating incoming requests for connectivity checks with the correct participants, handling situations in which participants may receive credentials for a conference but do not actually participate in the conference, participants jumping in and out of conferences, and other similar situations. Any solutions to these problems must also address scale as requests for connectivity checks can number in the thousands or millions in certain embodiments.

Systems and methods in accordance with various embodiments of the present disclosure may overcome one or more of the foregoing or other deficiencies experienced in conventional approaches for DDoS mitigation during connectivity checks for NAT traversal. In various embodiments, a web conferencing operator can configure a middlebox (e.g., NAT, firewall, DDoS mitigator, IDS, IPS, or other network appliance) to verify incoming requests for connectivity checks without persistent signaling between the web conference server and the middlebox. In some embodiments, the middlebox can validate an incoming request for a connectivity check on the basis of the username in the request. In some embodiments, the middlebox can validate an incoming request for a connectivity check on the basis of message integrity of the request.

Figure 3:
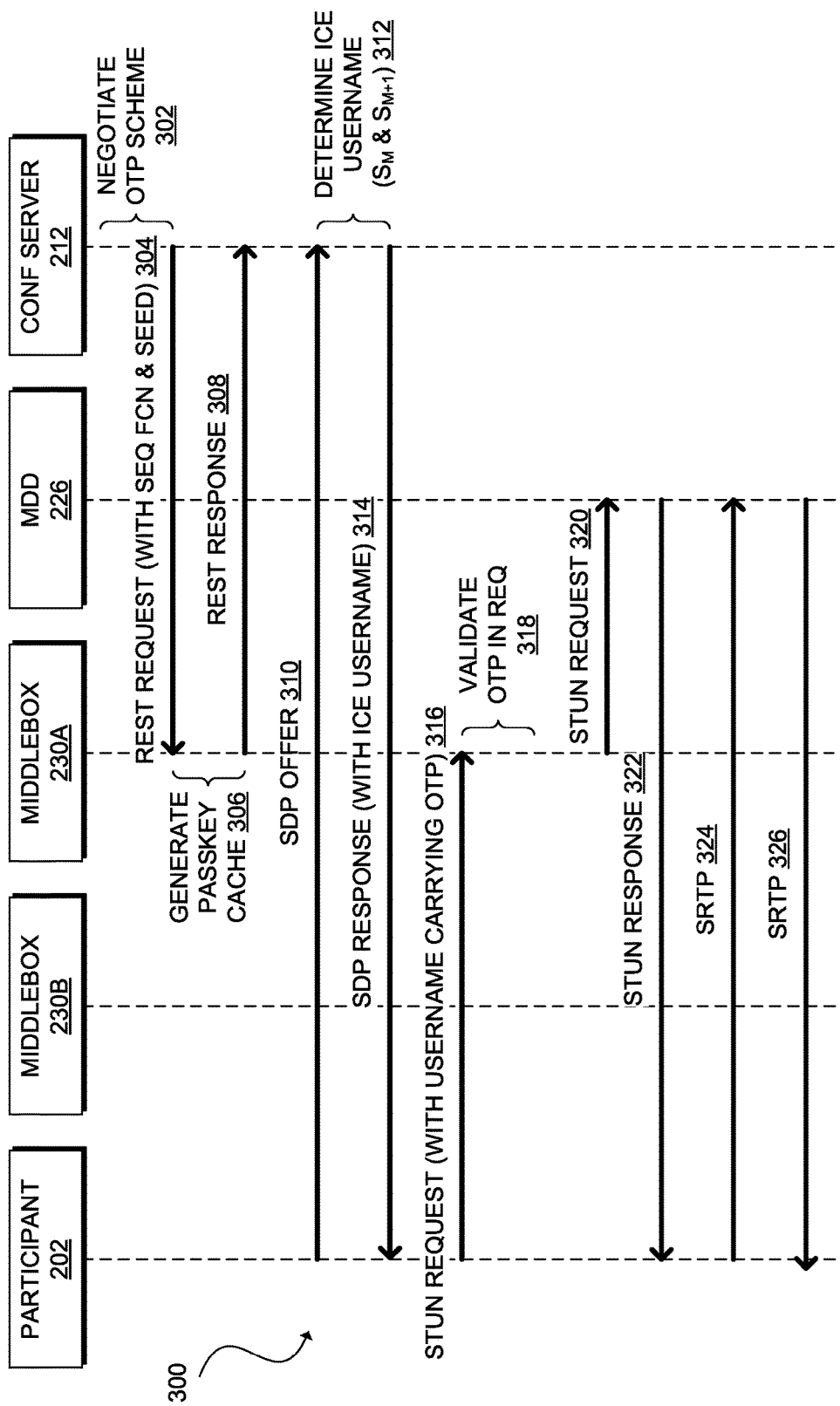
FIG. 3 illustrates an example of a sequence diagram of a process for mitigating a DDoS attack by validating a username in a request for a connectivity check in accordance with an embodiment.

FIG. 3 illustrates an example of sequence diagram 300 of a process for mitigating a DDoS attack by validating a username in a request for a connectivity check. One of ordinary skill will understood that, for any method discussed herein, there can be additional, fewer, or alternative steps performed in similar or alternative orders, or in parallel, within the scope of the various embodiments unless otherwise stated. The process can occur in a network environment similar to network configuration 200, which can include participant 202, middlebox 230B, middlebox 230A, MDD 226, and conference server 212. The process can also occur in other environments having a fewer number or a greater number of elements. For example, in some embodiments, a single logical entity can perform the functionality provided by conference server 212 and MDD 226. In other embodiments, a web conference platform can include a dedicated key manager for generating and distributing one-time passwords. Various other environments are also possible as known to one of ordinary skill.

The process can begin at 302 with conference server 212 implementing a one-time password (OTP) scheme to share with middlebox 230A to mitigate DDoS attacks. For example, conference server 212 can use the Lamport OTP algorithm, which involves generating a sequence of "passkey" values in which each successor value $S_n$ is based on the value of its predecessor $S_{n-1}$. In the Lamport OTP scheme, the client/server agree to use a common sequencing algorithm to generate a set of expiring one-time passwords (on the client side), and validate client-provided passkeys included in each client-initiated request (on the server side). The client can generate a finite sequence of values starting with a "seed" value, and each successor value is generated by applying a transforming function F to the previous sequence value:

$$S_0 = \text{Seed}, S_1 = F(S_0), S_2 = F(S_1), \ldots, S_n = F(S_{n-1}) \qquad \text{(Equation 1)}$$

The particular transforming function can be simple or complex so long as it produces the same result for a given value, i.e., applying the function F to the sequence value $S_m$ always generates the same successor sequence value $S_{m+1}$. For example, if the client wants to create a sequence of 10 values, starting with a seed value of 0, and the transforming function adds 3 to the value it's given (i.e., $F(S)=S+3$), then the resulting sequence (i.e., set of passkeys or passkey "cache") includes 0, 3, 6, 9, 12, 15, 18, 21, 24, and 27. The client/server can manage the sequence as a traditional last-in, first-out (LIFO) stack or other agreed-upon strategy (e.g., first-in, first-out, random, etc.). The client can consume sequence values one by one, and the server can eliminate consumed sequence values from the set of passkeys. For every client/server interaction, the client can include a client-identifier and one of the generated sequence values (i.e., the passkey) in a message. The server can validate the message by verifying that the particular client's passkey cache includes the provided passkey.

In some embodiments, conference server 212 can implement a variation of the Lamport OTP algorithm. For example, conference server 212 can generate a sequencing algorithm F and initial seed value $S_0$ to share with middlebox 230A, such as at 304 via a secure REST API. In other embodiments, conference server 212 can send the REST API request for middlebox 230A to generate F and $S_0$ and pass them back to conference server 212, such as via REST API response 308. In either case, at 306, middlebox 230A can generate a sequence of passkeys (i.e., passkey cache) by applying the sequencing algorithm F to $S_0$ to acquire the first passkey, and then applying the sequencing algorithm F to resulting passkeys for a specified number of requests n (or a specified period of time t based on a function T of the average number of requests received per unit of time u) to acquire additional passkeys.

In this example, participant 202 has previously acquired its candidate addresses (e.g., by sending STUN/TURN requests to STUN/TURN server 232 for middlebox 230B to bind reflexive and/or relayed candidates). In some embodiments, participant 202 can also perform tasks such as sending keep-alive requests for one or more candidates, prioritizing candidates (e.g., in accordance with RFC 5245 § 4.1.2.1), eliminating one or more redundant candidates, and selecting a default candidate. At 310, participant 202 can send an offer (e.g., an SDP offer in an SIP INVITE) to conference server 212 representing a request to establish a media session and participate in a web conference. The offer can include information for each transport candidate, such as a network address for the candidate, port, transport protocol, priority, foundation, component identifier, type, and related transport addresses. The offer can also include a username fragment and password. Table 1 sets forth an example of an SDP message with ICE attributes.

TABLE 1

Example of an SDP Message with ICE attributes

| | |
|---|---|
| 1: | v=0 |
| 2: | o=jdoe 2890844526 2890842807 IN IP4 10.0.1.1 |
| 3: | s= |
| 4: | c=IN IP4 192.0.2.3 |
| 5: | t=0 0 |
| 6: | a=ice-pwd:asd88fgpdd777uzjYhagZg |
| 7: | a=ice-ufrag:8hhY |
| 8: | m=audio 45664 RTP/AVP 0 |
| 9: | b=RS:0 |
| 10: | b=RR:0 |
| 11: | a=rtpmap:0 PCMU/8000 |
| 12: | a=candidate:1 1 UDP 2130706431 10.0.1.1 8998 typ host |
| 13: | a=candidate:2 1 UDP 1694498815 192.0.2.3 45664 typ srflx raddr 10.0.1.1 rport 8998 |

In a full ICE implementation, upon receiving the offer, a callee may perform tasks such as checking if the caller supports ICE, determining its role (i.e., controlling agent or controlled agent), gathering its transport candidates, prioritizing the candidates, choosing default candidates, forming connectivity check lists, scheduling checks, etc. However, in this example, conference server 212 has a public network address, and MDD 226 may have a public network address or conference server 212 can readily acquire one. Thus, conference server 212/MDD 226 can implement ICE Lite and forego many of these pre-answer tasks of the callee. At 312, conference server 212 can receive the SDP offer and determine a host address to provide in the SDP response for establishing the media session. In some embodiments, conference server 212 can operate as a cloud orchestrator to provision MDD 226 and acquire a network address for the provisioned resource. In other embodiments, conference server 212 can acquire a direct network address to MDD 226 or an address to one or more middleboxes (e.g., load balancers, inner NATs, inner firewalls, etc.) that ultimately reach MDD 226. Still other embodiments may use other techniques for acquiring a public network address known to those of ordinary skill in the art.

In addition, conference server 212 can generate a username and password to include in the SDP response. For instance, conference server 212 can set the username to be the combination of the last generated passkey $S_n$, a delimiter (other than a colon), and the sequence value $S_{n-1}$ associated with the last generated passkey $S_n$. However, this implementation permits the use of any (unused) sequence value-passkey pair from the passkey cache because participants may not initiate connectivity checks in the order they received the SDP answers. In this example, conference server can set the ICE password by using the short-term credential mechanism defined for STUN in RFC 5389 § 15.4.

At 314, conference server 212 can encode the SDP response to include a (direct or indirect) public network address (e.g., IP address, URL, etc.) for MDD 226, associated address information (e.g., port, component identifier, foundation, transport protocol, priority, type, related address, etc.), the sequence value-passkey pair (i.e., the OTP) as the username, and the ICE password for validating message integrity, and send the SDP response to participant 202.

At 316, participant 202 can initiate the connectivity checks phase by attempting to send a STUN request to MDD 226. The STUN request includes the username contained in the SDP response concatenated with a colon and a fragment of the username of participant 202 (e.g., "OTP:AFRAG") and the password contained in the SDP answer (e.g., "PASS_B").

At 318, middlebox 230A can inspect the STUN request to extract the sequence number and passkey from the username of the request. Middlebox 230A can validate the STUN request by applying the sequencing algorithm F to the sequence value to determine whether the result matches the passkey. If they do not match, middlebox 230A can drop the request. If the result of applying F to the sequence value matches the passkey within the username, middlebox 230A can forward the request to MDD 226. Middlebox 230A can also purge the sequence value-passkey pair from the passkey cache to prevent its reuse.

At 320, MDD 226 can receive the STUN request and send a STUN response at 322 to complete ICE processing (because conference server 212/MDD 226 implement ICE Lite), and media can flow from MDD 226 to participant 202 and vice versa (e.g., via Secure Real-Time Transport Protocol (SRTP) flows 324 and 326). In other embodiments where conference server 212/MDD 226 implement full ICE, there can be multiple STUN requests/responses before completion of the connectivity checks.

This process can be repeated for one or more additional participants who also want to attend the same or a different web conference within a period of time that the passkey cache remains valid. However, at 312, conference server 212 will select a different sequence value and corresponding passkey not yet exhausted in offers/answers to other participants.

Figure 4:
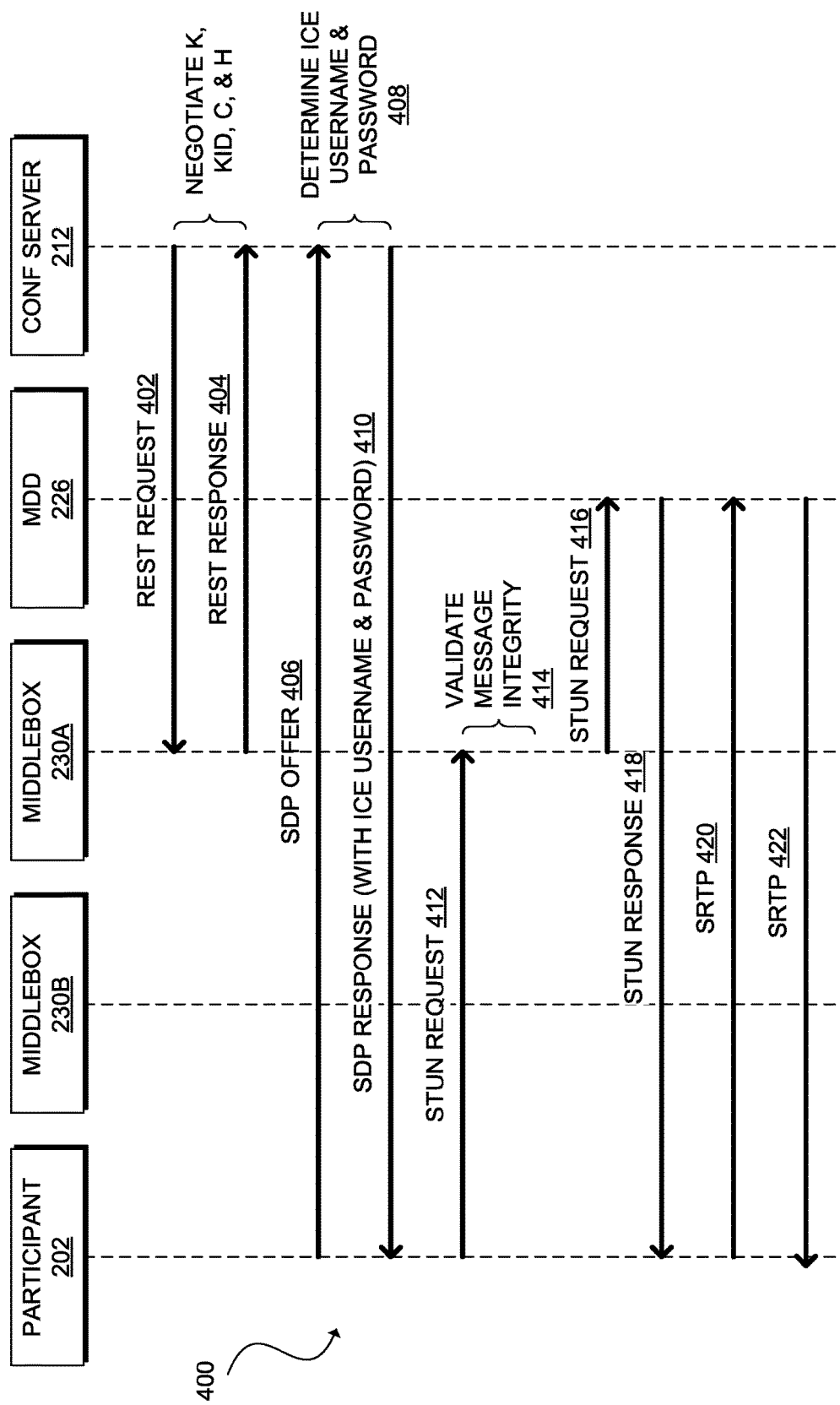
FIG. 4 illustrates an example of a sequence diagram of a process for mitigating a DDoS attack by validating the message integrity of a request for a connectivity check in accordance with an embodiment.

FIG. 4 illustrates an example of a sequence diagram 400 of a process for mitigating a DDoS attack by validating the message integrity of a request for a connectivity check. In this example, the process can occur in a network environment similar to network configuration 200, which can include participant 202, middlebox 230B, middlebox 230A, MDD 226, and conference server 212. However, the process can also occur in various other embodiments including an environment having at least one participant operating from behind a middlebox attempting to establish a media session with another participant.

In this example, the process can begin with conference server 212 negotiating with middlebox 230A to determine a secret key K, key identifier KID, counter C, and cryptographic hash function H (e.g., keyed-hash message authentication code (HMAC)-MD5, HMAC-SHA-1, HMAC-SHA-2, or other suitable HMAC algorithm) via a secure REST API request 402 and response 404. The REST API request/response 402-404 can be part of the same REST request/response sequence as 304-308 or can be a separate REST API request/response sequence. Conference server 212 can use the key identifier for key management.

At 406, participant 202 can send an offer (e.g., an SDP offer in an SIP INVITE) to conference server 212 representing a request to establish a media session and participate in a web conference. At 408, conference server 212 can create a short-term credential (i.e., username and password) for participant 202. Conference server 212 can determine the username using a similar process described with respect to FIG. 3. In addition, conference server 212 can concatenate the key identifier KID, counter C, and a current timestamp TS to the username.

Conference server 212 can compute the password using a second OTP scheme, such as a variation of the hash-based OTP (HOTP) algorithm set forth in the RFC 4226:

$$P = \text{Truncate}(H(K, C \| TS)), \quad \text{(Equation 2)}$$

where

P can represent the password;

Truncate can represent the function that converts a hash function value into an HOTP value as set forth in RFC 4226, § 5.3;

H can represent a cryptographic hash function (e.g., HMAC-SHA1 or HMAC-SHA2);

K can represent the secret key;

C can represent the counter; and

TS can represent the current timestamp (e.g., UNIX time).

At 410, conference server 212 can encode the SDP answer to include a (direct or indirect) public network address for MDD 226, associated address information, the username (i.e., OTP+KID+C+TS, where OTP=$S_m$+$S_{m+1}$), and the password P, and send the SDP answer to participant 202.

At 412, participant 202 can initiate the connectivity checks phase by attempting to send a STUN request to MDD 226. The STUN request includes the username contained in the SDP response concatenated with a colon and a fragment of the username of participant 202 (e.g., "OTP+KID+C+TS: AFRAG") and the password P contained in the SDP answer.

At 414, middlebox 230A can inspect each incoming request for a connectivity check. Middlebox 230A can extract the sequence number $S_m$, passkey $S_{m+1}$, key identifier KID, counter C, and timestamp TS from the username of the request. Middlebox 230A can validate the username by applying the sequencing algorithm F to the sequence value $S_m$ to determine whether the result matches the passkey $S_{m+1}$. Middlebox 230A can also validate the message integrity of the STUN request by applying the counter C and timestamp TS extracted from the username and the key K negotiated at 402-404 to Equation 2 to determine whether the result matches the password P encoded in the STUN request. If they do not match, middlebox 230A can drop the request. If they match, middlebox 230A can forward the request to MDD 226. An additional advantage of this approach is that the counter C and timestamp TS can also help the middlebox to detect and block replay attacks. For example, once middlebox 230A validates this particular value for the counter C, middlebox 230A can drop any other request including the same value.

At 416, MDD 226 can receive the STUN request and send a STUN response at 418 to complete ICE processing (because conference 212/MDD 226 implement ICE Lite), and media can flow from MDD to participant 202 at 420 and vice versa at 422.

This process repeats for one or more additional participants who also want to attend the same or a different web conference within a period of time that the secret key remains valid. However, at 408, conference server 212 will increment the counter C and acquire a new timestamp TS and calculate a new password for each additional participant.

Under some circumstances, a DDoS attack can overwhelm a middlebox if the number of invalid requests for connectivity checks grows beyond the capacity of the middlebox. In some embodiments, the middlebox can operate as a DDoS Open Threat Signaling (DOTS) client and signal a DOTS server (e.g., a third party provider of DDoS mitigation as a service) to take over DDoS mitigation. The middlebox can pass the values and algorithms negotiated with the web conference operator discussed with respect to FIG. 3 and FIG. 4 to the DOTS server, and the DOTS server can handle DDoS mitigation until the number of incoming requests for connectivity checks returns to a volume manageable by the middlebox (or a specified time thereafter to account for secondary DDoS attacks).

Figure 5:
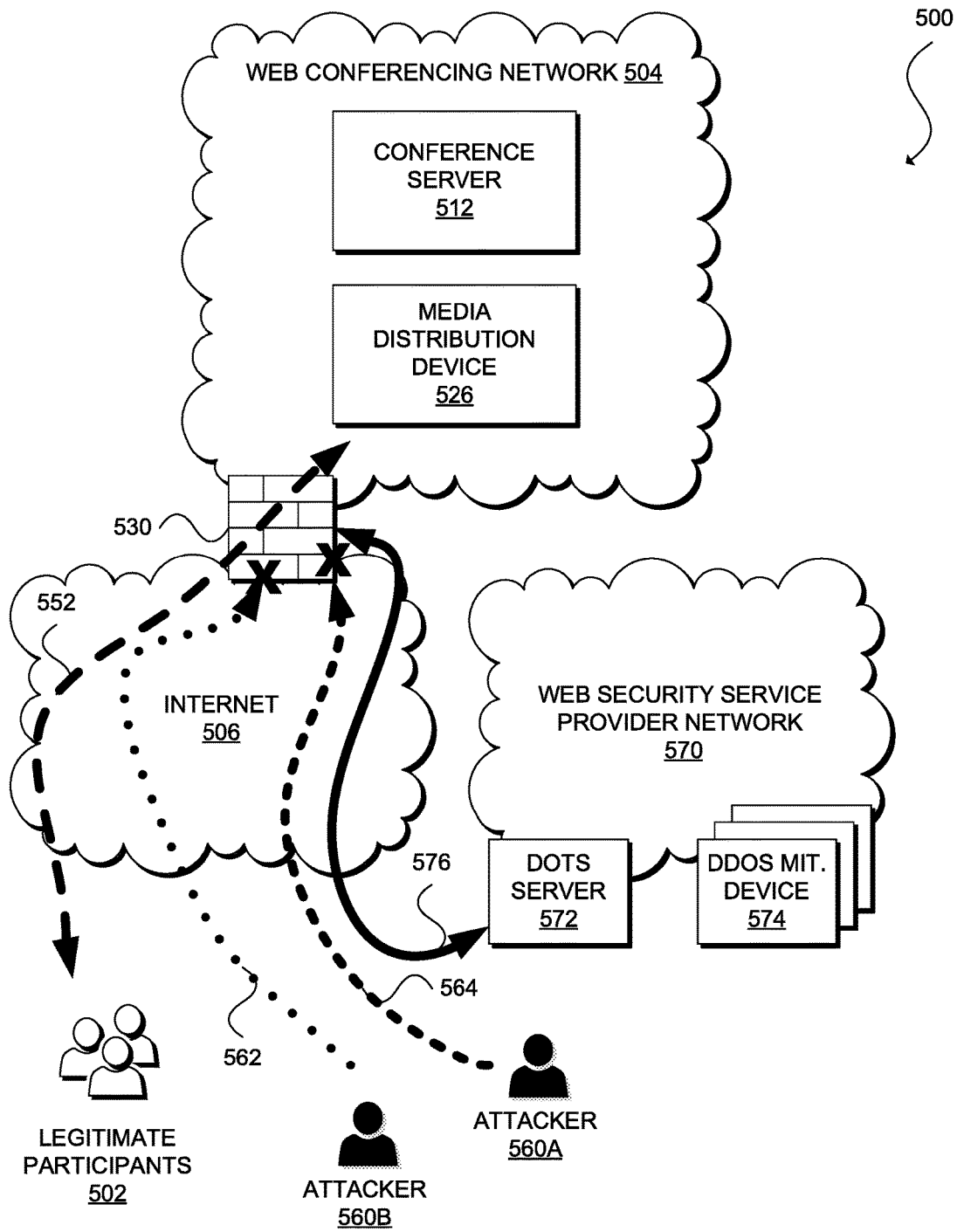
FIG. 5 illustrates an example of a network configuration including a web conference platform and a DDoS mitigation as a service provider platform in accordance with an embodiment.

FIG. 5 illustrates an example of a network configuration 500 including legitimate participants 502 and attackers 560A and 560B (collectively, "560") interacting with or attempting to interact with web conferencing network 504 over Internet 506. In particular, traffic from participants 502 can traverse middlebox 530 (e.g., a NAT, firewall, DDoS mitigator, etc.) to reach media distribution device 526 over communication channel 552. On the other hand, middlebox 530 blocks traffic from attackers 560A and 560B along communications 562 and 564, respectively, using the various techniques discussed in the present disclosure.

Network configuration 500 also includes web security service provider network 570. A web security service provider can offer various network management and security services, such as authentication, key and security certificate management, virus/malware/spyware detection and prevention, web application firewall (WAF) services, intrusion detection and prevention, DDoS mitigation, regulatory compliance, security event management, log management, and other security services. In this example, web security service provider network 570 includes DOTS server 572 and DDoS mitigation devices 574 for mitigating the effects of DDoS attacks against the web security service provider's customers, such as the provider of web conferencing network 504.

FIG. 5 also shows communication channel 576 (i.e., DOTS signal channel 576) between DOTS server 572 and middlebox 530 for middlebox 530 to signal DOTS server 572 when the number of DDoS attacks is too voluminous for middlebox 530 to handle. Middlebox 530 can operate as a DOTS client as set forth in IETF Internet-Draft for DOTS Requirements. DOTS server 572 can re-route incoming attack through security service provider network 570 (typically one or more high-bandwidth data centers) and DDoS mitigation devices 574 can scrub the traffic clean before returning it to web conferencing network 504. In some embodiments, middlebox 530 (or conference server 512) can also pass the values and algorithms for validating STUN requests to web security service provider network 570 so that web security service provider network 570 can use the same or similar mechanisms for mitigating the DDoS attacks.

Figure 6:
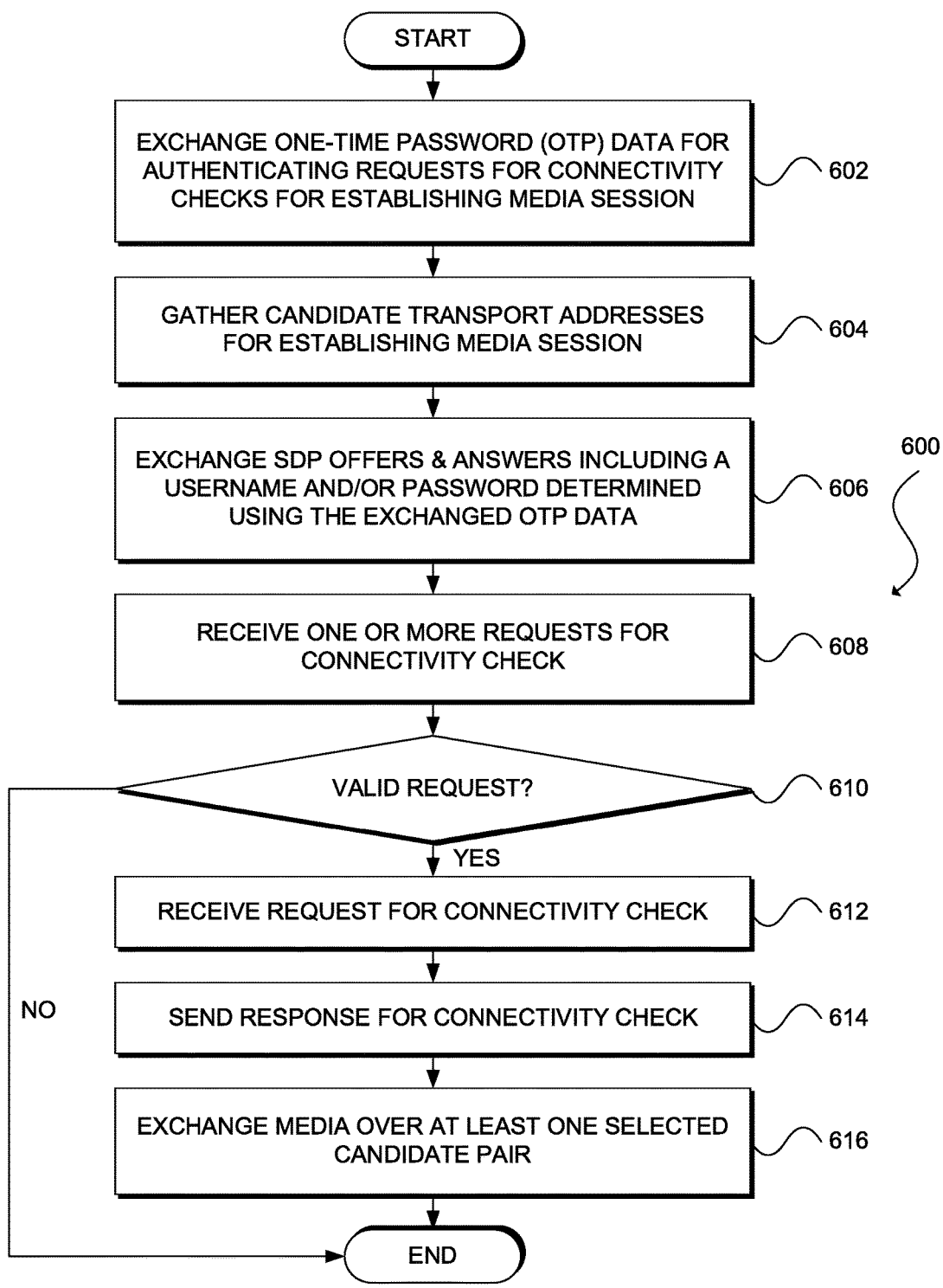
FIG. 6 illustrates an example of a process for mitigating a DDoS attack by validating a request for a connectivity check in accordance with an embodiment.

FIG. 6 illustrates an example of a process 600 for mitigating a DDoS attack by inspecting and validating a request for a connectivity check. A web conferencing network (e.g., web conferencing networks 104, 204, and 504), and particularly a conference server (e.g., conference servers 112, 212, and 512), a middlebox (e.g., middleboxes 230A and 530), a media distribution device (e.g., A/V devices 122, collaboration bridges 124, and MDDs 226 and 526), and other endpoints (e.g., endpoint devices of participants 102, 202, and 502) can perform some or all of the steps of process 600.

Process 600 can begin at 602 with a conference server and a middlebox exchanging one or more sets of one-time password (OTP) data for authenticating requests for connectivity checks. An example of an OTP scheme is the Lamport OTP algorithm, and the data for this scheme can include a sequencing algorithm F, a seed value $S_0$, and a sequence length L. Another example of an OTP algorithm is HOTP (defined in RFC 4226), and the data for this algorithm can include a secret key K, a key identifier kid, a counter C, a cryptographic hash function H (e.g., HMAC-MD5, HMAC-SHA-1, HMAC-SHA-2, etc.), and a timestamp TS. In some embodiments, the OTP data exchange can occur via one or more secure REST API request/response sequences.

At 604, participants to a media session (e.g., participants 102, 202, and 502; web conferencing network 104, 204, and 504; A/V devices 122; collaboration bridges 124; MDDs 226 and 526, etc.) can gather candidate transport addresses (e.g., IP addresses, URLs, etc.) for the media session. The candidate transport addresses can include one or more network addresses on directly attached network interfaces of endpoints, server reflexive addresses, and/or relayed addresses. The participants may send requests to one or more servers that support STUN and/or TURN to acquire server reflexive and/or relayed addresses. The STUN/TURN servers can reside within a publicly accessible portion of a caller's network (e.g., a public DMZ), in the Internet, or a publicly accessible portion of a callee's network, among other possibilities. In some situations, a participant may always be associated with a public network address and can forego candidate gathering and other actions, and implement a streamlined connectivity establishment protocol (e.g., ICE LITE).

At 606, the participants (e.g., an endpoint in a private network and a conference server) can exchange offers/answers for establishing a media session. In some embodiments, this exchange can occur over a signaling channel using SDP or other suitable signaling protocol. The offer or answer from the conference server can include a username and/or password derived or determined from the set(s) of OTP data exchanged between the conference server and the middlebox. For example, in some embodiments, the username can comprise a sequence value $S_m$ and its associated passkey $S_{m+1}$. In some embodiments, the username can also include other OTP data, such as a key identifier KID, a counter C, and a current timestamp TS. In some embodiments, the password can be computed by applying a cryptographic hash function (e.g., RFC 4226 or a variation thereof) using certain OTP data (e.g., secret key K, counter C, and timestamp TS). The offer or answer from the conference server can also include a (direct or indirect) public network address to an MDD.

One of the participant or the conference server can begin connectivity checks by sending binding requests (e.g., STUN requests) to determine connectivity between a local candidate-remote candidate pair of transport addresses. During this connectivity checks, the participant will send at least one binding request which a middlebox can receive at 608. The middlebox can reside in the same network as the conference server in between the Internet and the MDD. The middlebox can include logic for mitigating DDoS attacks by dropping invalid requests.

At 610, the middlebox can inspect a request for a connectivity check to determine whether the request is valid. The middlebox possesses secret data that only legitimate participants to a media session would also possess, i.e., secret data exchanged with a conference server and transmitted to a legitimate participant in an offer/answer to establish the media session. In some embodiments, the middlebox can verify the request on the basis of the username contained in the request. For example, the middlebox can implement a variant of the Lamport OTP algorithm whose secret data includes a sequencing algorithm F. The middlebox and conference server can also share a seed value $S_0$ and a sequence length L. The middlebox can generate a set of passkey values (i.e., a passkey cache) by applying the function F to S0 and successively applying the function F to $S_1 \ldots _{L-1}$ to acquire a set of sequence values $S_0 \ldots _{L-1}$ that map to a set of passkeys $S_1 \ldots _L$. The conference server can pass a sequence value-passkey pair as at least part of the user name to the legitimate participant in an SDP offer or answer. The participant can include this sequence value-passkey pair as at least part of the username in a STUN request (e.g., username="$S_m$+$S_{m+1}$:UF_A"). The middlebox can extract the sequence value $S_m$ and the passkey $S_{m+1}$ from the username contained in the request and apply F to $S_m$. If the result matches $S_{m+1}$, the middlebox can allow the request to proceed to its next destination (e.g., an MDD) and for process 600 to proceed to 612. In addition, the middlebox can purge the sequence value-passkey pair from the passkey cache to prohibit its reuse. On the other hand, if the result does not match, the middlebox can drop the request and process 600 can come to an end.

In some embodiments, the middlebox can also extract a counter C and a timestamp TS from the username in the request for the connectivity check. The middlebox can validate message integrity of the request by applying a cryptographic hash function (e.g., RFC 4226) using the secret key K exchanged at 602 and the counter C and timestamp TS extracted from the username. If the result of the application of the cryptographic hash function matches the password extracted from the request, then the middlebox can allow process 600 to advance to 612. Otherwise, the middlebox can drop the request and conclude process 600.

At 612, after an MDD receives a STUN request, the MDD can send a STUN response at 614. If the MDD implements ICE LITE, the connectivity checks phase ends, and media can flow between the participant and the MDD. If the MDD implements full ICE, the participant and the MDD can exchange one or more additional STUN requests/responses until both the MDD and the participant have completed their respective connectivity checks and settled on one or more candidate pairs for exchanging media. At 616, the MDD and the participant can send media using a transport protocol (e.g., Secure Real-Time Transport Protocol (SRTP) (defined in RFC 3711), SRTP Control Protocol (SRTCP), Real-Time Transport Protocol (RTP) (defined in RFC 3550), RTP Control Protocol (RTCP) (defined in RFC 3605), or other suitable transport protocol(s)).

Figure 7A:
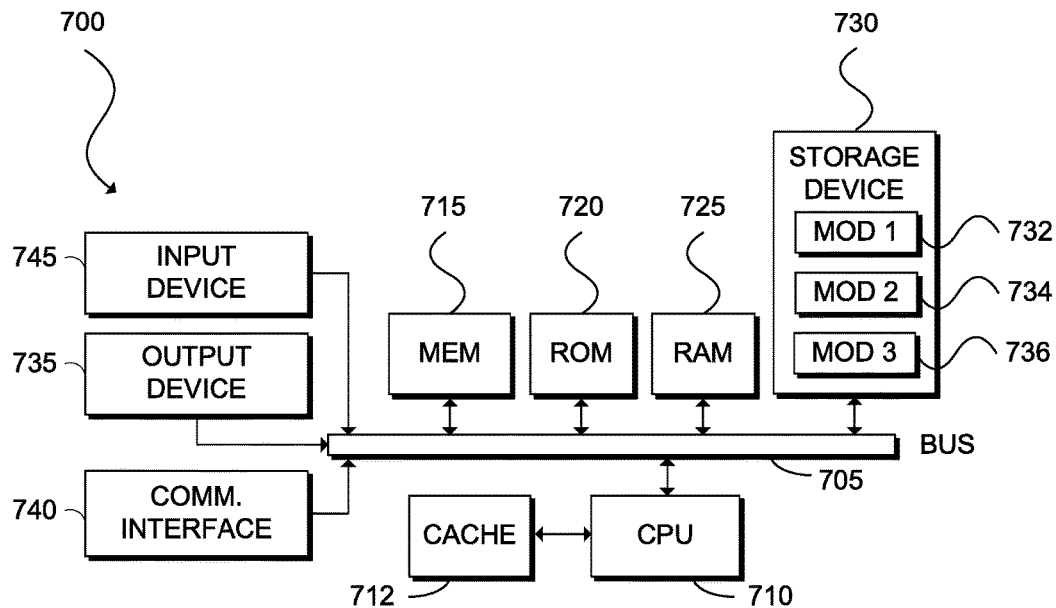
FIG. 7A and FIG. 7B illustrate examples of computing systems in accordance with various embodiments.

FIG. 7A illustrates an example of an architecture for a bus computing system 700. Computing system 700 can include central processing unit (CPU) 710 and system bus 705 that may couple various system components including system memory 715, memory (ROM) 720, and random access memory (RAM) 725, to CPU 710. Computing system 700 can include cache 712 of high-speed memory connected directly with, in close proximity to, or integrated as part of CPU 710. Computing system 700 can copy data from memory 715 and/or storage device 730 to cache 712 for quick access by CPU 710. In this way, cache 712 can provide a performance boost that avoids processor delays while waiting for data. These and other modules can control CPU 710 to perform various actions. Other system memory may be available for use as well. Memory 715 can include multiple different types of memory with different performance characteristics. CPU 710 can include any general purpose processor and a hardware module or software module configured to control CPU 710 as well as a special-purpose processor where software instructions are incorporated into the actual processor design. CPU 710 may essentially be a completely self-contained computing system, containing multiple cores or processors, a bus, memory controller, cache, etc. A multi-core processor may be symmetric or asymmetric.

To enable user interaction with computing system 700, input device 745 can represent any number of input mechanisms, such as a microphone for speech, a touch-protected screen for gesture or graphical input, keyboard, mouse, motion input, speech and so forth. Output device 735 can also be one or more of a number of output mechanisms known to those of skill in the art. In some instances, multimodal systems can enable a user to provide multiple types of input to communicate with computing system 700. Communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and hybrids thereof. Storage device 730 can include software modules 732, 734, 736 for controlling CPU 710.

In some embodiments, a computing system that performs a particular function can include the software component stored in a computer-readable medium in connection with the necessary hardware components, such as CPU 710, bus 705, output device 735, and so forth, to carry out the function.

Figure 7B:
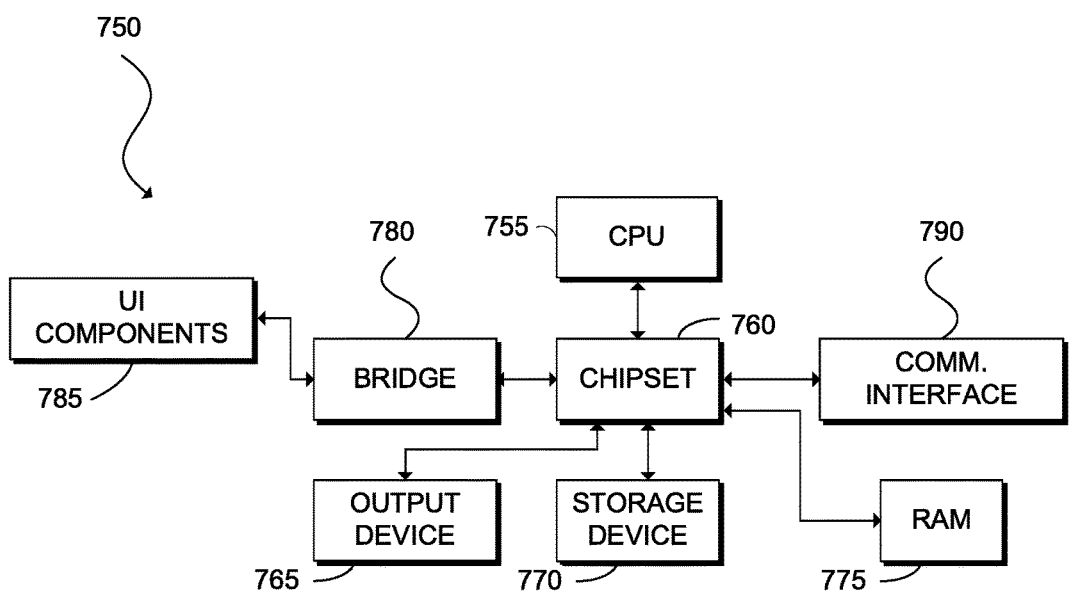

FIG. 7B illustrates an example of an architecture for chipset computing system 750. Computing system 750 can include CPU 755, representative of any number of physically and/or logically distinct resources capable of executing software, firmware, and hardware configured to perform identified computations. CPU 755 can communicate with chipset 760 to control input to and output from CPU 755. In this example, chipset 760 can output information to output device 765, such as a display, and can read and write information to storage device 770, which can be a hard disk drive (HDD), solid state drive (SSD), or a combination thereof (i.e., hybrid drive). Chipset 760 can also read data from and write data to RAM 775.

Computing system 750 can also include bridge 780 for interfacing with a variety of user interface components 785 and chipset 760. User interface components 785 can include a keyboard, a microphone, touch detection and processing circuitry, a pointing device, such as a mouse, and so on. Inputs to computing system 750 can come from any of a variety of sources, machine generated and/or human generated.

Chipset 760 can also interface with one or more communication interfaces 790 that can have different physical interfaces. Communication interfaces 790 can include interfaces for wired and wireless LANs, for broadband wireless networks, as well as personal area networks. Some applications of the methods for generating, displaying, and using user interfaces disclosed in the present disclosure can include receiving ordered datasets over the physical interface or generating the data by processor 755 analyzing data stored in storage device 770 or the RAM 775. Further, computing system 750 can receive inputs from a user via user interface components 785 and execute appropriate functions, such as browsing functions by interpreting these inputs using CPU 755.

One of ordinary skill in the art will appreciate that computing systems 700 and 750 can have more than one processor 710 and 755, respectively, or can be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described embodiment can reside within computer-executable instructions stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media used to store instructions, information used, and/or information created during methods according to described examples can include magnetic or optical disks, flash memory, universal serial bus (USB) devices provided with non-volatile memory, networked storage devices, and so on.

Devices implementing methods according to the present disclosure can comprise hardware, firmware, and/or software, and can take any of a variety of form factors. Typical examples of such form factors include laptops, smart phones, small form factor personal computers, personal digital assistants, rack-mount devices, standalone devices, and so on. Functionality described in the present disclosure can also reside in peripherals or add-in cards. Such functionality can also reside on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information explain aspects within the scope of the appended claims, one of ordinary skill will understand not to imply any limitation based on particular features or arrangements in such examples, as one of ordinary skill would be able to use these examples to derive a wide variety of implementations. Further and although the present disclosure may describe some subject matter in language specific to examples of structural features and/or method steps, one of ordinary skill will understand that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving one-time password (OTP) data for validating one or more connectivity checks for establishing a media session, the OTP data including a sequencing function;
determining a set of passkeys by applying the sequencing function to a seed value to acquire a first passkey and successively applying the sequencing function to a latest passkey to acquire one or more additional passkeys;
sending at least one of an offer or an answer to an endpoint for establishing the media session, at least one of the offer or the answer including a first username that includes a passkey from the set of passkeys and a successive passkey from the set of passkeys;
receiving a request for a connectivity check from the endpoint for establishing the media session, the request including a second username that includes the passkey and the successive passkey; and
validating the second username based at least in part by applying the sequencing function to the passkey included in the second username to acquire a computed value and comparing the computed value to the successive passkey included in the second username.

2. The computer-implemented method of claim 1, further comprising:
receiving second OTP data for validating the one or more connectivity checks, the second OTP data including a secret key;
concatenating a first counter and a first timestamp to the first username;
determining a first password for at least one of the offer or the answer by applying a cryptographic hash function to the first counter and the first timestamp using the secret key; and
validating a message integrity of the request based at least in part by applying the cryptographic hash function to a second counter included in the request and a second timestamp included in the request using the secret key to acquire a second computed value and comparing the second computed value to a second password included in the request.

3. The computer-implemented method of claim 2, further comprising:
determining that the second computed value matches the second password;
determining that the second counter has not been included in a previous request; and
forwarding the request to a next destination.

4. The computer-implemented method of claim 2, further comprising:
determining at least one of the second computed value mismatching the second password or the second counter being included in a previous request; and
dropping the request.

5. The computer-implemented method of claim 2, further comprising:
sending at least one of a second offer or a second answer to a second endpoint for establishing a second media session, at least one of the second offer or the second answer including a third username that includes a second passkey from the set of passkeys and a second successive passkey from the set of passkeys.

6. The computer-implemented method of claim 5, further comprising:
incrementing the second counter to acquire a new counter;
acquiring a current timestamp as a new timestamp; and
determining a new password for at least one of the second offer or the second answer by applying the cryptographic hash function to the new counter and the new timestamp using the secret key.

7. The computer-implemented method of claim 1, further comprising:
determining that a number of requests for connectivity checks for establishing the media session exceeds a capacity of a middlebox; and
sending a signal to a distributed denial of service attack (DDoS) open threat signaling (DOTS) server for receiving the requests for connectivity checks.

8. The computer-implemented method of claim 7, further comprising:
sending the OTP data to the DOTS server.

9. The computer-implemented method of claim 1, further comprising:
determining that the computed value matches the successive passkey;
determining that the set of passkeys includes the successive passkey;
purging the successive passkey from the set of passkeys; and
forwarding the request to a next destination.

10. The computer-implemented method of claim 1, further comprising:
determining at least one of the computed value mismatching the successive passkey or the set of passkeys excluding the successive passkey; and
dropping the request.

11. A system comprising:
a processor; and
a non-transitory computer-readable medium storing instructions that, upon execution by the processor, cause the system to:
acquire one-time password (OTP) data for validating one or more connectivity checks for establishing a media session with a media distribution device (MDD), the OTP data including a sequencing function;

determine a set of passkeys by applying the sequencing function to a seed value to acquire a first passkey and successively applying the sequencing function to a latest passkey to acquire one or more additional passkeys;

receive a request for a connectivity check from an endpoint external to a web conferencing network for establishing the media session with the MDD, the request including a username that includes a sequence value and a passkey; and validate the username based at least in part by applying the sequencing function to the sequence value to acquire a computed value and comparing the computed value to the passkey.

12. The system of claim 11, wherein the instructions further cause the system to:

receive, from a conference server, a secure representational state transfer (REST) application programming interface (API) request including the OTP data.

13. The system of claim 11, wherein the instructions further cause the system to:

generate the OTP data in response to receiving a secure REST API request from a conference server; and send to the conference server a secure REST API response including the OTP data.

14. A computer-implemented method comprising:

acquiring one-time password (OTP) data for validating one or more connectivity checks for establishing a media session, the OTP data including a sequencing function and a secret key;

determining a set of passkeys by applying the sequencing function to a seed value to acquire a first passkey and successively applying the sequencing function to a latest passkey to acquire one or more additional passkeys;

determining a username including a passkey from the set of passkeys, a successive passkey from the set of passkeys, a counter, and a timestamp;

determining a password by applying a cryptographic hash function to the counter and the timestamp using the secret key; and sending at least one of an offer or an answer to an endpoint for establishing the media session, at least one of the offer or the answer including the username and the password.

15. The computer-implemented method of claim 14, further comprising:

determining that a number of requests for connectivity checks for establishing the media session exceeds a capacity of a middlebox; and sending a signal to a distributed denial of service attack (DDos) open threat signaling (DOTS) server for receiving the requests for connectivity checks.

16. The computer-implemented method of claim 15, further comprising:

sending the OTP data to the DOTS server.

17. The computer-implemented method of claim 16, wherein the DOTS server uses the OTP data to validate the requests for connectivity checks.

18. The computer-implemented method of claim 16, further comprising:

incrementing the counter to acquire a second counter;

acquiring a current timestamp as a second timestamp;

determining a second username including a second passkey from the set of passkeys and a second successive passkey from the set of passkeys, the second counter, and the second timestamp;

determining a second password for at least one of a second offer or a second answer by applying the cryptographic hash function to the second counter and the second timestamp using the secret key; and sending at least one of the second offer or the second answer to a second endpoint for establishing a second media session, at least one of the second offer or the second answer including the second username and the second password.

19. The computer-implemented method of claim 14, further comprising:

provisioning a media distribution device (MDD) for establishing the media session; and configuring a network to locate a middlebox for validating one or more requests for connectivity checks for establishing the media session between an external network and the MDD.

20. The computer-implemented method of claim 19, wherein the OTP data is acquired via at least one of a secure representational state transfer (REST) application programming interface (API) request or a secure REST API response between a conference server and the middlebox.

* * * * *